United States Patent [19]

Graham et al.

[11] Patent Number: 5,398,612

[45] Date of Patent: Mar. 21, 1995

[54] NITRATE ESTER STABILIZING LAYER FOR PROPELLANT GRAIN

[75] Inventors: William H. Graham; Robert E. Askins; Robert L. Stanley, all of Huntsville, Ala.

[73] Assignee: Thiokol Corporation, Ogden, Utah

[21] Appl. No.: 14,949

[22] Filed: Feb. 17, 1987

[51] Int. Cl.6 .......................... C06D 5/06; C06B 45/10
[52] U.S. Cl. .................... 102/287; 102/291; 199/19.93
[58] Field of Search .................... 149/19.93; 102/288-292

[56] References Cited

U.S. PATENT DOCUMENTS

| | | | |
|---|---|---|---|
| 3,882,784 | 5/1975 | Nauflett et al. | 102/103 |
| 3,882,784 | 5/1975 | Nauflett et al. | 102/103 |
| 3,956,890 | 5/1976 | Davis | 60/219 |
| 3,994,757 | 11/1976 | Dunigan et al. | 149/98 |
| 3,994,946 | 11/1976 | Dunigan et al. | 149/88 X |
| 4,000,025 | 12/1976 | Johnson et al. | 149/19.93 |
| 4,094,712 | 6/1978 | Goddard et al. | 149/10 |
| 4,408,534 | 10/1983 | Araki et al. | 102/288 |

FOREIGN PATENT DOCUMENTS 1605239 9/1985 United Kingdom .

OTHER PUBLICATIONS

British Search Report, R. C. Kennell-Search Examiner Date of Search-21 Oct. 1988.

*Primary Examiner*—Peter A. Nelson
*Attorney, Agent, or Firm*—L. Craig Metcalf; Ronald L. Lyons

[57] ABSTRACT

Compositions and methods for increasing the storage life of a propellant grain by reducing the rate of decomposition of its nitrate ester components. A nitrate ester stabilizer is placed in a layer adjacent to a nonburning surface of the propellant grain. The stabilizer migrates from the layer into the grain's nonburning surface to provide additional stabilization for the entire grain, especially portions of the grain adjacent to the protected nonburning surface.

14 Claims, 5 Drawing Sheets

NITRATE ESTER STABILIZING LAYER FOR PROPELLANT GRAIN

TECHNICAL FIELD

The present invention relates to liners, insulation, and insulating liners (the latter are included herein as "insulation" unless the context indicates otherwise) disposed between the propellant grain and casing of a solid fueled rocket motor or a similar device in which a propellant is burned at a controlled, moderate rate.

BACKGROUND

In a typical solid fueled rocket motor, illustrated in FIGS. 1 and 2, a case 10 of metal or reinforced polymeric material is provided to which a nozzle 12 is attached. Within case 10 is a propellant grain 14 having a burning surface 16 and an outer or nonburning surface 18. (When surface 18 is referred to as a "nonburning" surface, this means that burning does not propagate from surface 18. Instead, the propellant grain burn propagates from surface 16. The entire propellant grain, including the portions defining surface 18, ultimately will burn.) Outer surface 18 is bonded to the inner surface 20 of case 10 to provide structural integrity and to make outer surface 18 a nonburning surface. The necessary bonding between surfaces 18 and 20 is facilitated by a liner 22 typically having a polymeric base compatible with the binder of grain 14, adhering to nonburning surface 18 and insulation 24. Insulation 24 is directly bonded to inner surface 20. In some structures or parts of structures, liner 22 is bonded directly between nonburning surface 18 and inner surface 20.

The motor is constructed by providing case 10, placing insulation 24 where needed to protect the casing, applying a liner 22 to all interior surfaces of the insulation and casing which are to receive the propellant, precuring liner 22, and then casting propellant grain 14 within the casing. The propellant grain is then cured and becomes bonded to the liner. Optionally, a sheet or layer of inhibitor material can be bonded to any exposed surface of the propellant intended to be a nonburning surface. (The composition of an inhibitor is similar to that of a liner.)

Propellants sometimes contain various nitrate esters, and some propellants consist mainly of nitrate esters. Nitrate esters serve as energetic binders, explosives, and plasticizers, and burn to produce a large volume of relatively low molecular weight gas. However, nitrate esters can decompose when the propellant grain is stored, particularly when exposed to heat. The products of decomposition accelerate further decomposition, so once started the decomposition process is self-catalyzing. The decomposition products of nitrate esters can also convert the carbamate linkages in urethane based propellant binders to gaseous products which form cracks or voids in the grain. To prevent nitrate ester decomposition and increase the storage life of the cured propellant grain, propellants usually contain a homogeneously mixed nitrate ester stabilizer. Heretofore, all of the stabilizer has been mixed into the propellant grain uniformly so it would be available where the compounds to be stabilized are found.

However, the present inventors have discovered that nitrate esters in a propellant grain do not decompose uniformly. The nonburning surface 18 of the grain, which is confined by the casing, decomposes most quickly. Decomposition proceeds more quickly near the casing because the decomposition products cannot escape easily, so they remain in place and catalyze further decomposition. Another possible contributing factor is interaction of the binder with liner ingredients. If enough stabilizer is homogeneously disposed in the grain to prevent decomposition adjacent to the casing, the rest of the grain will contain excess stabilizer. The stabilizer displaces more energetic components, and unnecessarily increases the weight of the propellant grain.

Furthermore, when the stabilizer is mixed uniformly at relatively low levels in the propellant grain, approximately 10 to 30 percent of the stabilizer reacts with the isocyanate cure agent of the isocyanate binder, and so is unavailable to prevent nitrate ester decomposition. This increases the amount of stabilizer which must be added to the propellant to leave an effective level of stabilizer after the propellant is cured, when little or no free isocyanate remains in the propellant.

As a result of nitrate ester decomposition, rocket motors age and must be replaced periodically to ensure reliable performance. Also, all nitrate esters used in a propellant grain must be relatively pure to avoid premature decomposition.

OBJECTS OF THE INVENTION

The following invention is intended to meet one or more of the following objects.

A first object of the invention is to increase the useful storage life of solid fueled rocket motors containing nitrate esters.

A second object of the invention is to allow less highly purified nitrate esters to be used in propellant grains without reducing the reliability or storage life of rocket motors including such grains.

A third object of the invention is to concentrate more of the stabilizer for nitrate esters in the parts of the propellant grain where it is needed most, and particularly in the portion of the propellant grain nearest to the rocket case, without requiring that the composition of the propellant grain be non-uniform.

A fourth object of the invention is to minimize the amount of homogeneously mixed nitrate ester stabilizer required in the propellant grain.

Other objects of the invention will become apparent from the present specification.

SUMMARY OF THE INVENTION

One aspect of the present invention is the combination of 1) a nitrate ester containing propellant grain having a nonburning surface; and 2) at least one layer of material adjacent to the nonburning surface comprising a nitrate ester stabilizer. ("Adjacent" elements specified herein are not only elements which touch or share a common boundary, but also elements which are near each other but separated by an intervening layer.) The stabilizer is present in an amount sufficient to stabilize the nitrate ester in the propellant by migrating from the adjacent layer into the propellant grain through its nonburning surface. In a preferred embodiment of the invention, the layer containing the stabilizer is the liner of the rocket motor.

A second aspect of the invention is a liner composition comprising an elastomeric polymeric binder and a mobile nitrate ester stabilizer.

Still another aspect of the invention is a method for increasing the storage life of a propellant grain having a nonburning surface and comprising a nitrate ester. The method comprises the step of placing a layer including a nitrate ester stabilizer adjacent to a nonburning surface of the propellant grain. The method is particularly useful for stabilizing the nonburning surfaces of the propellant grain which are adjacent to the casing of a rocket motor.

DETAILED DESCRIPTION OF THE INVENTION

Figure 1:
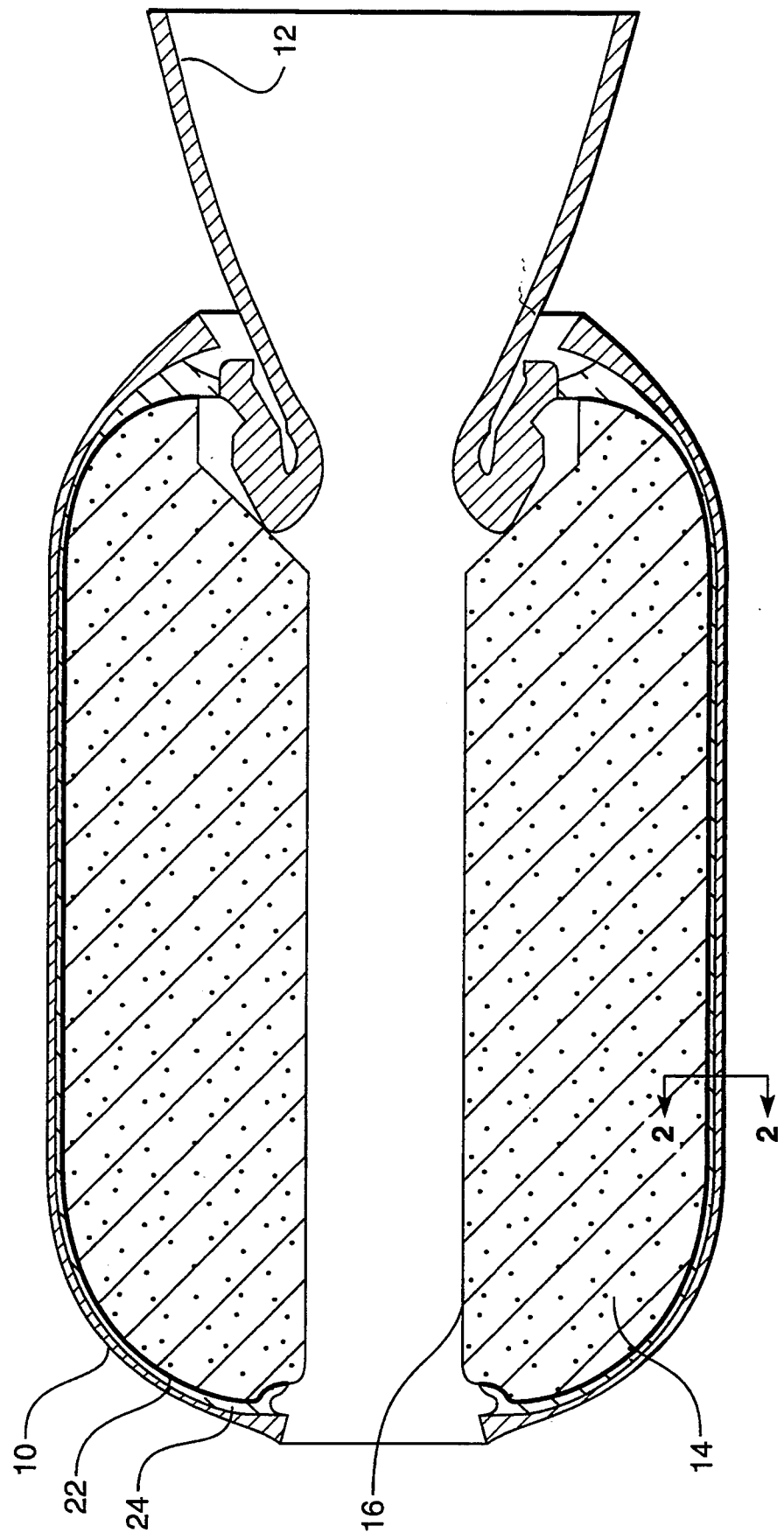
FIG. 1 is a schematic cutaway view of a prior art rocket motor, illustrating the parts thereof.
Figure 2:
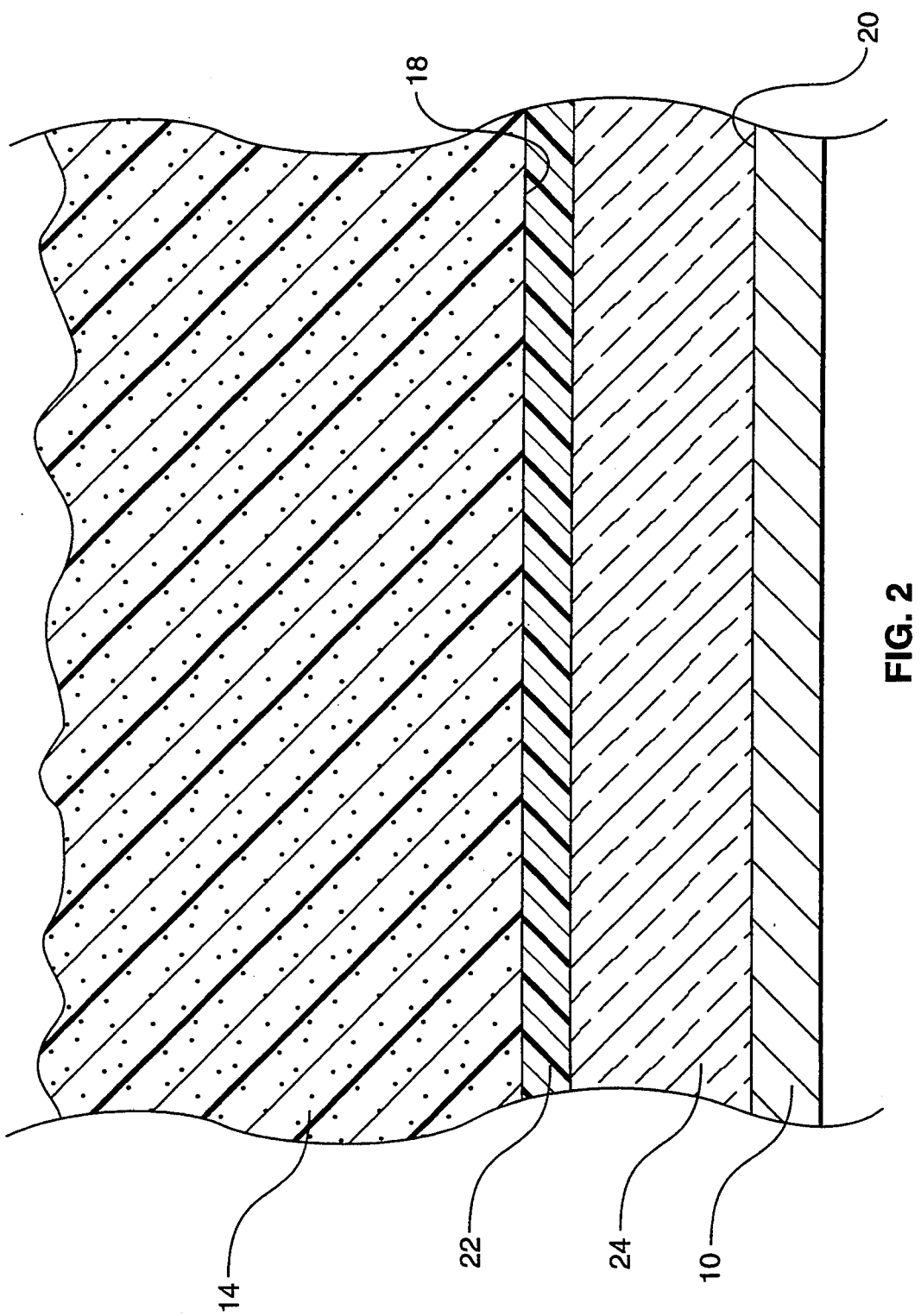
FIG. 2 is a fragmentary cross-section taken along line 2—2 of FIG. 1, enlarged to show details of the propellant, liner, insulation, and case of the rocket motor.

Stabilizing layers useful for rocket motors described herein can be provided in a variety of configurations, depending upon the design of the motor. The stabilizing layer can be a separate layer not associated with other functions, part of the usual liner interfacing between the propellant and the insulation or case, part of the insulation usually disposed between the liner and case, or part of an insulating liner joining the propellant grain to the case. It is preferred, but not essential, that the stabilizing layer be one of the known layers of a rocket motor, thereby combining the function of stabilization with another function such as bonding or insulation.

If the stabilizing layer is the liner, the stabilizer should comprise from about 1 to about 25%, preferably from 3–20%, and most preferably more than 10% of the liner composition.

The amount of nitrate ester stabilizers previously used in propellant grains has been from about 0.25 to about 3%, and typically about 1% to 2%, of the propellant composition. Incorporation of additional stabilizer in the liner allows the proportion of stabilizer in the grain to be reduced. The total weight of stabilizer in the rocket is also reduced, since more stabilizer is removed from the propellant grain than is added to the liner.

Nitrate ester stabilizers are known. The following exemplary stabilizers are contemplated for incorporation in the liner:

N-methyl-4-nitroaniline (MNA)
2-nitrodiphenylamine (2-NDPA)
4-nitrodiphenylamine (4-NDPA)
sym-diethyldiphenylurea (ethyl centralite)
diphenylamine More broadly, the stabilizing material can be any mildly alkaline organic compound which can combine with oxides of nitrogen formed during exothermic decomposition of a nitrate ester, thus eliminating the free decomposition products which catalyze further decomposition.

The other usual ingredients of liners can remain in the liner compositions. The liner contains a polymeric base (formed by curing a prepolymer with a curing agent) the same as or compatible with that in the propellant and fillers such as carbon black, titanium dioxide, or silica to control viscosity, thixotropy, and flow. If the liner is for use with a high energy propellant, nitrocellulose can be embedded in the liner before it is cured. Other than this application, liners are typically substantially free of nitrate esters as formulated.

In an alternate embodiment of the invention, the stabilizing layer is the case insulation or insuliner of a rocket motor. The nitrate ester stabilizer, which can be selected from the ones listed previously in connection with the liner, is from 1% to 10%, preferably 1% to 5%, most preferably more than 3% of the insulation composition. (Less stabilizer will suffice in insulation than in a liner because the insulation is thicker and thus will hold more stabilizer.) The insulation also typically contains up to 70% by weight of a polymeric binder, up to about 46% by weight of asbestos or another insulating filler, up to 27% of other fillers such as zinc oxide, lead oxide, ferric oxide, and fumed silica, and other ingredients in minor proportions. Insulation is typically substantially free of nitrate esters, as formulated.

Propellants useful herein are those which contain a nitrate ester as one or more components thereof. Nitrate esters used in propellant grains usually fall into the categories of plasticizers, energetic binders, high explosives, and combinations thereof. The accompanying tables exemplify the nitrate ester plasticizers, polymers, and high explosives commonly used for propellants.

| Abbreviation | Name | Also Known As |
|---|---|---|
| | Nitrate Ester Plasticizers | |
| NG | nitroglycerine | — |
| BTTN | 1,2,4 butanetrioltrinitrate | — |
| TMETN | trimethylolethanetrinitrate | 2-methyl-2-[(nitrooxy)methyl]-1,3-propanediol dinitrate ester; metriol trinitrate |
| EGDN | ethylene glycol dinitrate | — |
| DEGDN | diethylene glycol dinitrate | — |
| TEGDN | triethylene glycol dinitrate | — |
| NIBTN | nitroisobutanetrinitrate | — |
| — | nitroisobutylglycerol trinitrate | — |
| PDN | 1,3-propanediol dinitrate | — |
| TMMTN | 2-hydroxymethyl-1,3 propanediol trinitrate | trimethylolmethanetrinitrate |
| PETRIN | pentaerythritol trinitrate | — |
| | Nitrate Ester Polymer | |
| NC | nitrocellulose | cellulose nitrate |
| | Nitrate Ester High Explosives | |
| PETRIN | pentaerythritol trinitrate | — |
| PETN | pentaerythritol tetranitrate | — |

The classical double base propellant can contain up to 50% or more nitroglycerin, which functions as a monopropellant and a plasticizer, and up to 50% or more nitrocellulose, which functions as a monopropellant and polymeric binder. Other propellants typically contain from about 15–30% of a nitrate ester plasticizer.

The present method invention is practiced by placing a stabilizing layer as described herein adjacent to a nonburning surface of a propellant grain without any impermeable barrier between them so that the stabilizers can migrate into the propellant grain to stabilize the entire propellant grain, especially the region of the propellant grain adjacent to the nonburning surface.

One advantage of the present invention is that the rate of diffusion of the nitrate ester stabilizer into the propellant varies according to the temperature of the motor. If the motor's temperature increases, the amount of stabilizer diffusing into the motor increases, thus counteracting the usual acceleration of nitrate ester decomposition as the propellant grain temperature increases. More stabilizer is released when more is needed.

Another advantage of the invention is that less of the nitrate ester stabilizer is exposed to unreacted isocyanate moieties of the propellant grain binder before curing is complete. Consequently, less of the stabilizer is lost to reaction with isocyanates. Although isocyanates are often used in liner composition binders, the proportion of stabilizer in the liner is large enough that little of it is lost to reaction with free isocyanates in the binder. Also, in the case of MNA, which is solid and does not dissolve in the binder, the interaction between MNA and the isocyanate is minimal.

EXAMPLES

The following examples are provided to illustrate the present invention, not to limit the scope of the claimed invention. Reference should be made to the claims for a description of the scope of the invention.

Example 1

First, three liner compositions were prepared. They had the respective formulas set forth in Table 1:

TABLE 1

| Ingredient | %/Wt. |
|---|---|
| Liner A | |
| R45 HT[1] | 57.81 |
| DDI[2] | 13.92 |
| HX-868[3] | 4.00 |
| Thermax[4] | 24.00 |
| Maleic Anhydride | 0.135 |
| Triphenyl Bismuth | 0.135 |
| Total | 100.000 |
| Liner B | |
| R45 HT | 57.81 |
| DDI | 13.92 |
| HX-868 | 4.00 |
| MNA | 3.00 |
| Thermax | 21.00 |
| Maleic Anhydride | 0.135 |
| Triphenyl Bismuth | 0.135 |
| Total | 100.000 |
| Liner C | |
| R45 HT | 57.81 |
| DDI | 13.92 |
| HX-868 | 4.00 |
| MNA | 10.00 |
| Thermax | 14.00 |
| Maleic Anhydride | 0.135 |
| Triphenyl Bismuth | 0.135 |
| Total | 100.000 |

[1]trademark for a hydroxyl-terminated polybutadiene prepolymer sold by Arco Chemical Co., Philadelphia, Pennsylvania.
[2]a trademark for diisocyanate curing agent sold by Henkel Corporation, Minneapolis, Minnesota.
[3]a trademark for trimesoyl 1-(2-ethyl) aziridine sold by 3M Company, Minneapolis, Minnesota.
[4]a trademark for carbon black sold by R. T. Vanderbilt Co., Inc., Norwalk, Connecticut.

One inch hollow aluminum cubes (the sixth sides are missing so the cubes are open cups) were lined on the five interior sides with the respective liners set forth in Table 1. In the first liner, no MNA was present, in the second, 3% MNA replaced a corresponding portion of the carbon, and in the third, 10% MNA replaced a corresponding portion of the carbon content. Additional cubes were left unlined. Ten of each type of cube were prepared.

Next, a propellant composition was provided, having the ingredients stated in Table 2:

TABLE 2

| Propellant Composition A | |
|---|---|
| Ingredient | %/Wt. |
| nitrocellulose | 0.300 |
| BTTN[1] | 15.200 |
| TMETN | 7.614 |
| Dow E 4500[2] | 2.260 |
| PCP 0260[3] | 1.700 |
| PCP 0300[4] | .425 |
| MNA | .500 |
| Carbon black | .500 |
| RDX[5] | 47.250 |
| HMX[6] | 20.550 |
| Zirconium carbide | 1.000 |
| Lead oxide (Pb$_3$O$_4$) | 1.000 |
| triphenyl bismuth | .025 |
| maleic anhydride | .025 |
| Desmodur N-100[7] | 1.651 |
| Total | 100.000 |

[1]80% active, 20% CH$_2$Cl$_2$
[2]a trademark for polyethylene glycol sold by Dow Chemical Co., Midland, Michigan.
[3]a trademark for a difunctional polycaprolactone sold by Union Carbide.
[4]a trademark for a trifunctional polycaprolactone sold by Union Carbide.
[5]generic abbreviation for sym-trimethylene trinitramine.
[6]generic abbreviation for sym-tetramethylene tetranitramine.
[7]a trademark for a polyfunctional isocyanate curing agent sold by Mobay Chemical Co., Pittsburgh, Pennsylvania.

The cubes were filled with the propellant composition and cured at 145° F. (63° C.) for four days. Immediately following the cure, the end of which was defined as an aging time of zero days, the MNA content and nitroso-MNA (decomposition product of MNA) content of the propellant near the center of one cube of each composition were measured. The cubes of each composition were divided into two groups, respectively stored at 195° F. (91° C.) and 165° F. (74° C.). At each indicated aging time, the MNA content and nitroso-MNA content of one of the cubes of each composition in each group were measured. The results are reported in Table 3.

TABLE 3

| Aging Time (days) | Aging Temp. (°C.) | MNA Content (%) | | | |
|---|---|---|---|---|---|
| | | No Liner | No MNA Liner A | 3% MNA Liner B | 10% MNA Liner C |
| 0 | — | .359 | — | — | — |
| 1 | 91 | .255 | .240 | .265 | .319 |
| 2 | 91 | .128 | .113 | .141 | .247 |
| 3 | 91 | .064 | .049 | .021 | .187 |
| 4 | 91 | .007 | .007 | .011 | .098 |
| 7 | 74 | .246 | .230 | .280 | .349 |
| 14 | 74 | .192 | .152 | .218 | .355 |
| 21 | 74 | .102 | .062 | .143 | .167 |
| 28 | 74 | .000 | .000 | .015 | .167 |
| Aging Time (days) | Aging Temp. (°C.) | Nitroso-MNA (%) | | | |
| | | No Liner | No MNA Liner A | 3% MNA Liner B | 10% MNA Liner C |
| 0 | — | .039 | — | — | — |
| 1 | 91 | .148 | .158 | .152 | .151 |
| 2 | 91 | .278 | .309 | .327 | .237 |
| 3 | 91 | .355 | .282 | .440 | .366 |
| 4 | 91 | .386 | .402 | .442 | .481 |
| 7 | 74 | .140 | .151 | .151 | .143 |
| 14 | 74 | .256 | .282 | .302 | .302 |
| 21 | 74 | .336 | .392 | .383 | .364 |

TABLE 3-continued

| | | | | | |
|---|---|---|---|---|---|
| 28 | 74 | .409 | .468 | .490 | .450 |

The following conclusions are supported by the data in Table 3. First, the concentration of MNA is somewhat lower near the liner without MNA than when no liner is present. Second, the concentration of MNA in the propellant adjacent to the 3% and the 10% MNA liner remains at considerably higher levels for a longer time than the concentration of MNA in the propellant adjacent to no liner or to the liner without MNA. Third, the nitroso-MNA increases somewhat more rapidly near the liner without MNA than next to the aluminum in the no liner trial, showing that the liner interface is detrimental to propellant stability. In addition, the 3% and 10% MNA liners produce a somewhat higher nitroso-MNA content because they provide additional MNA to compete with the binder for the nitrogen oxide decomposition products.

Example 2

For this example a rocket motor liner containing 20% MNA was coated about 0.25 mm thick on a metal shim about 51 mm square and a body of propellant 18 mm thick was formed against the liner. The liner composition (D) is shown in Table 4.

TABLE 4

| Ingredient | %/Wt. |
|---|---|
| R45 HT | 48.515 |
| DDI | 11.215 |
| MNA | 20.000 |
| Thermax carbon | 20.000 |
| Maleic anhydride | 0.135 |
| Triphenyl bismuth | 0.135 |
| Total | 100.000 |

Propellant composition A of Example 1 was used. The liner and propellant were cured in the usual fashion. After aging at 165° F. (74° C.), the propellant was sliced parallel to the liner at 3 mm intervals to form slabs, so the proportion of stabilizer at various distances from the liner/propellant interface could be measured. A sample from each slab was analyzed for percent MNA initially and after each week of aging. For comparison, a specimen employing a similar liner containing no MNA (which was replaced by additional carbon black filler) was similarly aged and analyzed. The comparison specimen was not cut into slabs; the proportion of MNA reported is an average for the entire thickness of propellant.

Figure 3:
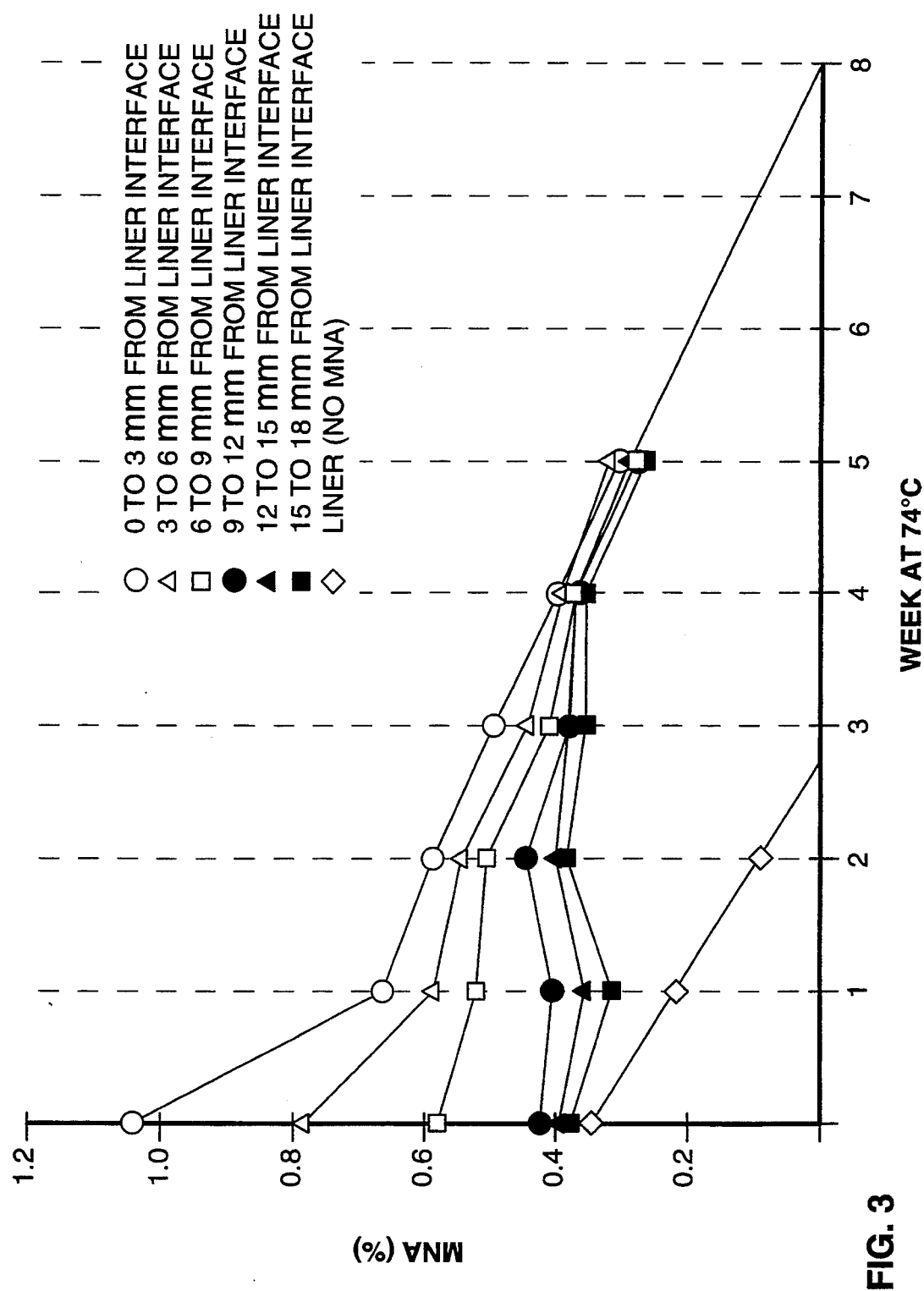
FIG. 3 is a plot of MNA content of propellant versus time. The several plots show MNA content at different distances from the propellant/liner interface.

The results of this test are shown in FIG. 3 and Table 5.

TABLE 5

| Distance of Slab from Liner (mm) | Weeks Aging at 165° F. (74° C.) | % MNA by Weight |
|---|---|---|
| 0–3 | 0 | 1.03 |
| 3–6 | 0 | .79 |
| 6–9 | 0 | .58 |
| 9–12 | 0 | .42 |
| 12–15 | 0 | .40 |
| 15–18 | 0 | .38 |
| 0–3 | 1 | .67 |
| 3–6 | 1 | .59 |
| 6–9 | 1 | .52 |
| 9–12 | 1 | .40 |
| 12–15 | 1 | .36 |
| 15–18 | 1 | .31 |
| 0–3 | 2 | .59 |
| 3–6 | 2 | .55 |
| 6–9 | 2 | .51 |
| 9–12 | 2 | .44 |
| 12–15 | 2 | .40 |
| 15–18 | 2 | .38 |
| 0–3 | 3 | .49 |
| 3–6 | 3 | .44 |
| 6–9 | 3 | .41 |
| 9–12 | 3 | .38 |
| 12–15 | 3 | .38 |
| 15–18 | 3 | .36 |
| 0–3 | 4 | 0.40 |
| 3–6 | 4 | 0.39 |
| 6–9 | 4 | 0.38 |
| 9–12 | 4 | 0.38 |
| 12–15 | 4 | 0.37 |
| 15–18 | 4 | 0.37 |
| 0–3 | 5 | 0.30 |
| 3–6 | 5 | 0.32 |
| 6–9 | 5 | 0.29 |
| 9–12 | 5 | 0.28 |
| 12–15 | 5 | 0.29 |
| 15–18 | 5 | 0.27 |
| Comparison sample | | |
| overall | 0 | 0.33 |
| overall | 1 | 0.22 |
| overall | 2 | 0.09 |

As is evident from FIG. 3, the proportion of MNA in the propellant is at first determined by the distance of the specimen from the liner interface. However, the proportions converge after about four weeks, indicating that the MNA is equilibrated at an essentially constant proportion which is independent of distance from the liner. This indicates efficient diffusion of MNA from the liner into and through the propellant. Also, the data for the liner containing no MNA shows that far less MNA remained in the propellant composition which was not replenished by MNA from a liner. The propellant in the comparison sample was essentially free of MNA in less than three weeks of accelerated aging.

Similar results were obtained with an epoxy binder based liner and the same propellant composition.

Example 3

To directly demonstrate the ability of liners containing a nitrate ester stabilizer to prevent void formation in an adjacent propellant grain, test specimens with and without MNA in their liners were x-rayed.

Liner D and propellant A formulations were used. Specimens were prepared and aged identically to those of Example 2, except that the propellant slabs adhered to the liner were one inch (25 mm), two inches (51 mm), or three inches (76 mm) thick, and were not sliced. Also, the liners were 10 mils (0.25 mm) thick in some samples and 20 mils (0.5 mm) thick in others. The specimens were x-rayed weekly during aging, and the x-rays were examined for evidence of void formation. For each sample, the time when voids were first discovered is recorded in Table 6. "Weeks to Void Formation" shows the cumulative results of several trials.

TABLE 6

| Propellant Thickness (mm) | Liner Thickness (mm) | Liner Composition | Weeks to Void Formation |
|---|---|---|---|
| 25 | 0.25 | No MNA | 5–6 |
| 25 | 0.25 | 20% MNA | 10.5–11.5 |
| 25 | 0.5 | 20% MNA | 9.5–10.5 |
| 51 | 0.25 | No MNA | 2–3 |

TABLE 6-continued

| Propellant Thickness (mm) | Liner Thickness (mm) | Liner Composition | Weeks to Void Formation |
|---|---|---|---|
| 51 | 0.25 | 20% MNA | 6-7 |
| 51 | 0.50 | 20% MNA | 7-8 |
| 76 | 0.25 | No MNA | 2-3 |
| 76 | 0.50 | 20% MNA | 2-3 |

Qualitatively, all the control liners (with no MNA) showed extensive void formation at the end of the test, particularly adjacent to the liner interface. All the samples containing MNA, even the 76 mm thick samples in which voids first appeared at about the same time with or without MNA, showed far less void formation. These results show that motors having nitrate ester stabilizers in their liners have storage lives two or three times as long as comparable motors containing no stabilizers in their liners. Thus, the storage lives of rocket motors can be greatly extended.

Example 4

To check whether the addition of MNA to a rocket motor liner has any adverse effect on the mechanical properties or the rocket motor, liner C and propellant D of Example 1 were prepared, aged for various lengths of time at 165° F. (74° C.), sampled, and then tested at 77° F. (25° C.) using the ½ scale JANNAF dogbone tests described in 1981 *Structures and Mechanical Behavior Subcommittee Meeting, Pasadena, California*, CPIA Publication No. 351, December, 1981. The foregoing is hereby incorporated herein by reference. The results are in Table 7.

TABLE 7

(Part 1)

| Sample | Time at 74° C. (Weeks) | Liner MNA Content (%) | Distance from Interface (mm) |
|---|---|---|---|
| 1 | 0 | 0 | 13 |
| 2 | 2 | 0 | 13 |
| 3 | 4 | 0 | 13 |
| 4 | 0 | 10 | 13 |
| 5 | 2 | 10 | 13 |
| 6 | 4 | 10 | 13 |
| 7 | 0 | 0 | 33 |
| 8 | 2 | 0 | 33 |
| 9 | 4 | 0 | 33 |
| 10 | 0 | 10 | 33 |
| 11 | 2 | 10 | 33 |
| 12 | 4 | 10 | 33 |

(Part 2)

| Sample | Modulus psi | Modulus N/cm$^2$ | Stress psi | Stress N/cm$^2$ | Corrected Stress psi | Corrected Stress N/cm$^2$ |
|---|---|---|---|---|---|---|
| 1 | 268 | 185 | 78.4 | 54.1 | 168 | 116 |
| 2 | 276 | 190 | 62.3 | 43.0 | 144 | 99 |
| 3 | 192 | 132 | 45.4 | 31.3 | 102 | 70 |
| 4 | 286 | 197 | 71.1 | 49.0 | 143 | 99 |
| 5 | 275 | 190 | 62.1 | 42.8 | 145 | 100 |
| 6 | 284 | 196 | 54.0 | 37.2 | 123 | 85 |
| 7 | 256 | 177 | 70.6 | 48.7 | 145 | 100 |
| 8 | 263 | 181 | 53.8 | 37.1 | 115 | 79 |
| 9 | 210 | 145 | 49.0 | 33.8 | 114 | 79 |
| 10 | 256 | 177 | 70.6 | 48.7 | 145 | 100 |
| 11 | 248 | 171 | 53.6 | 37.0 | 116 | 80 |
| 12 | 258 | 178 | 50.2 | 34.6 | 112 | 77 |

(Part 3)

| Sample | Strain at Maximum Stress (%) | Ultimate Strain (%) |
|---|---|---|
| 1 | 114 | 114 |
| 2 | 129 | 130 |
| 3 | 124 | 124 |
| 4 | 101 | 101 |
| 5 | 133 | 134 |
| 6 | 127 | 128 |
| 7 | 105 | 106 |
| 8 | 111 | 112 |
| 9 | 131 | 132 |
| 10 | 105 | 106 |
| 11 | 117 | 118 |
| 12 | 123 | 124 |

The mechanical testing data summarized in Table 7 show only one significant change in propellant properties due to liner composition: the modulus of elasticity dropped as a result of aging at elevated temperature for the liner with no MNA, while the liner with MNA shows no such drop under parallel conditions. The mechanical properties of the propellant adjacent the MNA-treated liner are thus better than the properties of the propellant adjacent the untreated liner.

Example 5

The influence of a nitrate ester stabilizer in a liner on the burn rate of the adjacent propellant was tested as follows.

Liners A (no MNA) and C (10% MNA) were prepared and respectively deposited on opposing inner side walls of a metal foil insert supported within a cardboard carton. The containers were then filled with propellant A, which was cured at 145° F. (63° C.) for four days, as before. The specimen was cut vertically along a plane between and parallel to the two liners, forming a separate specimen for each liner. The specimens were then aged for 0, 2, 4, and 6 weeks at 165° F. (74° C.). At the end of each aging period each specimen was sliced horizontally to sever a piece, then the piece was cut parallel to the liner as close as possible to the liner (about 0.1 inches or 2 mm), and a second time about ⅛ inch (3 mm) away from the first cut to form a slab of propellant which had aged adjacent to and parallel to the liner. ⅛ inch (3 mm) by 2½ inch (64 mm) strands of propellant were cut from interior portions of the slabs.

The cut strands were then burned at ambient temperature at a pressure of 1800 p.s.i. (1241 N/cm$^2$). The relative burn rates of the samples are stated in Table 8.

TABLE 8

| Weeks at 74° C. | Relative Burn Rate for Propellant With Control Liner (A) | Relative Burn Rate for Propellant With 10% MNA Liner (C) |
|---|---|---|
| 0 | 1.000 | .986 |
| 2 | .993 | .995 |
| 4 | 1.003 | .993 |
| 6 | 1.060 | 1.024 |

An effect of a treated liner on the burn rate of the adjacent propellant is noted in the samples stored six weeks, in which the burn rate of the control increased more than the burn rate of the propellant adjacent to the treated liner. This again suggests the treated liner prevents the formation of voids (which would increase the burn rate of the propellant).

Example 6

The effect of adding a nitrate ester stabilizer to the bonding properties of a liner was measured using peel tests. These tests were conducted with Propellant A of Example 1, Propellant B having the composition reported in Table 9, and Liners A (no MNA) and D (20% MNA) of Examples 1 and 2.

TABLE 9

| PROPELLANT B | |
|---|---|
| Ingredient | %/Wt. |
| cellulose acetate butyrate | 0.300 |
| BTTN (80% active, 20% CH$_2$Cl$_2$) | 15.200 |
| TMETN | 7.614 |
| Dow E 4500 | 2.260 |
| PCP 0260 | 2.125 |
| MNA | 0.500 |
| Carbon Black (Thermax) | 0.500 |
| RDX | 47.250 |
| HMX | 20.550 |
| Zirconium carbide | 1.000 |
| Lead oxide | 1.000 |
| Triphenyl bismuth | 0.025 |
| Maleic anhydride | 0.025 |
| Desmodur N-100 | 1.651 |
| Total | 100.000 |

Each peel test sample was prepared by coating a 2.75 inch (7.0 cm) by 4.75 inch (12.1 cm) piece of insulation (nominal thickness 0.1 inches, 2.5 mm) with the chosen liner (nominal thickness 0.02 inches, 0.5 mm). The liner was then precured in place to a constant hardness, and a washer consisting of a sheet of TEFLON polytetrafluoroethylene with a two inch (5.08 cm.) square opening was placed on the liner at one end of the piece of insulation to define the area of the bond between the propellant and liner. A peel mold frame (2.25 by 2.25 inches, 32.7 cm$^2$) was placed on top of the washer and held in place by rubber bands and propellant was cast into the peel mold to a depth of approximately 1 inch (2.54 cm). The peel mold frame had a reverse taper, thus retaining the propellant sample in the peel frame during the peel test. After complete cure of the propellant, the force to peel the insulation and liner from the propellant is measured when the free end of the insulation and liner (insulation and liner but no propellant) is pulled at a 90 degree angle away from the peel mold frame. The force to effect separation is reported in pounds per linear inch (pli) or Kg/cm and is used as a measure of propellant to liner bond strength. The results are in Table 10.

TABLE 10

| Storage Time at 74° C. (Weeks) | Liner MNA Content (Wt. %) | Peel Value | |
|---|---|---|---|
| | | pli* | Kg/cm* |
| Propellant A | | | |
| 0 | 0 | 2.0 | 2.3 |
| 0 | 10 | 2.9 | 3.8 |
| 2 | 0 | 2.7 | 3.1 |
| 2 | 10 | 2.1 | 2.4 |
| Propellant B | | | |
| 0 | 0 | 30.5 | 35.1 |
| 0 | 20 | 26.3 | 30.2 |
| 2 | 0 | 24.7 | 28.4 |
| 2 | 20 | 22.0 | 25.3 |

*pounds per linear inch; Kg per linear centimeter

The differences in peel values between the respective liners are smaller than experimental error. All samples failed in the thin coat of propellant adjacent to the liner.

An adhesion test was also performed for the first two samples in Table 7. The test sample was prepared by placing insulation (nominal thickness 0.1 inch, 2.5 mm) onto a 2 inch by 2½ inch (5.1 by 6.4 cm) steel plate and precuring the chosen liner (nominal thickness 0.02 inches, 0.5 mm) on top. A polytetrafluoroethylene washer (outer diameter about 1.75 inches, 4.45 cm, inside diameter about 1 square inch, 6.45 cm$^2$) was then placed on top of the liner, an aluminum cylinder was placed upright on top of the washer, and the assembly was held together with rubber bands while about one inch of propellant was cast into the cylinder. After full cure of the propellant, the sample was tested in tension by pulling the top of the cylinder perpendicularly away from the steel plate until the sample failed. The results are reported in pounds per square inch (psi) and N/cm$^2$, and once again provide a measure of the liner-to-propellant bond strength.

The adhesion value was 82 psi (57 N/cm$^2$) for the liner containing no stabilizer and 54 psi (37 N/cm$^2$) for the liner containing 10% MNA. This difference is marginally within the experimental error expected for this test and shows that the MNA liner still has adequate adhesion for use in a rocket motor. Additionally, the hardness of the liner could be increased to correct for the softening effect of MNA, and thus improve the adhesion of the MNA-containing liner.

Example 7

A tactical rocket motor prototype 71 inches (180 cm) long and 5 inches (13 cm) in diameter was fabricated using Liner A (0.010 inches, 0.25 mm, thick) and Propellant B. The motor was ballistically tested successfully; no bond discrepancies or unexpected ballistic behavior was observed.

These examples illustrate that use of a liner containing a nitrate ester stabilizer slows down the formation of gas in the propellant substantially, without adversely affecting the other mechanical, bonding, and burning characteristics of the propellant and liner.

Examples 8–13

In these examples, a nitrate ester stabilizer was incorporated in insuliner compositions. (Both insulators and insuliners are sometimes referred to herein as "insulators", for convenience.) 0.1 inch (2.5 mm) thick sheets of HYPALON (HYPALON is a registered trademark of E. I. dupont de Nemours & Co., Wilmington, Del., for chlorosulfonated polyethylene rubber) and polyisoprene-based rocket motor insulation were first formulated. The approximate beginning compositions of these respective types of insulation are set forth in Table 11.

TABLE 11

| HYPALON INSULATION | | |
|---|---|---|
| Ingredient | %/wt. | parts by weight |
| HYPALON 40 | 34.88 | 75 |
| Polyethylene | 0.93 | 2 |
| TAC[1] | 1.86 | 4 |
| VAROX Powder[2] | 2.79 | 6 |
| HYPALON LD 999 | 11.63 | 25 |
| MAGLITE D[3] | 4.65 | 10 |
| CARBOWAX 4000[4] | 1.40 | 3 |
| Hi-Sil 233[5] | 20.93 | 45 |
| KEVLAR[6] fiber (¼ inch, 6 mm) | 20.93 | 45 |
| Total | 100.00 | 215 |

[1]trademark for an epoxy/polysulfide vulcanizing agent sold by Protex-A-Cote, Inc., Newark, N.J.
[2]VAROX is a trademark for a 50% active blend of 2,5-bis-(tertiary butyl peroxy)-2,5-dimethylhexane and a carrier, sold by R. T. Vanderbilt Co., Inc., Norwalk, Connecticut.
[3]trademark for magnesium oxide sold by E. Merck, Darnstadt, West Germany.
[4]CARBOWAX is a trademark for polyethylene glycol sold by Union Carbide Corp., New York City, New York.
[5]Hi-Sil is a trademark for hydrated, amorphous silica sold by PPG Industries, Inc., Pittsburgh, Pennsylvania.
[6]KEVLAR is a trademark for an aromatic polyamide fiber sold by E. I. duPont de Nemours & Co.

POLYISOPRENE INSULATION

TABLE 11-continued

| Ingredient | %/wt. | parts by weight |
|---|---|---|
| NATSYN[1] 2200 | 55.18 | 100 |
| Zinc oxide | 2.76 | 5 |
| Stearic acid | 1.10 | 2 |
| Sulfur | 1.38 | 2.5 |
| AGERITE SPAR[2] | 0.55 | 1.0 |
| B-L-E[3] 25 | 0.28 | 0.5 |
| SANTOCURE[4] NS | 0.83 | 1.5 |
| PEG 4000 | 1.66 | 3.0 |
| TMTM[5] | 0.39 | 0.7 |
| Hi-Sil EP | 24.83 | 45 |
| KEVLAR fibers (¼ inch, 6 mm) | 11.04 | 20 |
| Total | 100.00 | 181.2 |

[1]trademark for cis-1,4-polyisoprene rubber sold by Goodyear Tire & Rubber Co., Akron, Ohio.
[2]trademark for mixed mono-, di-, and tristyrenated phenol antioxidant sold by B. F. Goodrich Chemical Cleveland, Ohio.
[3]trademark for reaction product of diphenylamine and acetone, sold as an antioxidant by Uniroyal Chemical Div., Naugatuck, Connecticut.
[4]trademark for rubber accelerators sold by the Monsanto Industrial Chemicals Co., St. Louis, Missouri.
[5]tetramethylthiuram monosulfide.

Each sheet of insulation was soaked in a 10% (weight/weight) solution of MNA in methylene chloride or acetone. Some of the insulation samples were cured and some were uncured during the soaking step. The solvent was removed by drying each sheet in air for 72 hours at ambient temperature. The results of solvent treatment are summarized in Table 12.

TABLE 12

| Example | Insulation Type | State | Solvent | percent weight gained (lost) |
|---|---|---|---|---|
| 8 | HYPALON | cured | methylene chloride | 6.9 |
| 9 | HYPALON | uncured | acetone | 5.1 |
| 10 | HYPALON | uncured | acetone | 3.9 |
| 11 | Polyisoprene | cured | methylene chloride | (−0.2) |
| 12 | Polyisoprene | uncured | acetone | (−1.0) |
| 13 | Polyisoprene | cured | acetone | (−1.9) |

In Table 12, the examples are arranged in the order of net weight gain. Higher weight gains are preferred because they indicate less leaching of insulation components due to solvent treatment. The HYPALON composition proved better able to withstand solvent treatment than the polyisoprene composition, although all the insulation identified in Table 12 took up MNA and did not lose large amounts of weight. Methylene chloride treatment of uncured insulation was not successful, however, because these specimens dissolved.

The insulation of Example 9 and a non-MNA treated blank were bonded in the usual manner to 51 mm square metal shims representing a metal motor case, then an 18 mm thick propellant body was cast and cured in contact with each sample of insulation, to which it bonded directly without an intermediate layer of a liner. The sample was aged, sliced parallel to the insulation into slabs, and the MNA content of each slab was measured as for Example 2. The resulting data are presented directly in FIG. 4.

Figure 4:
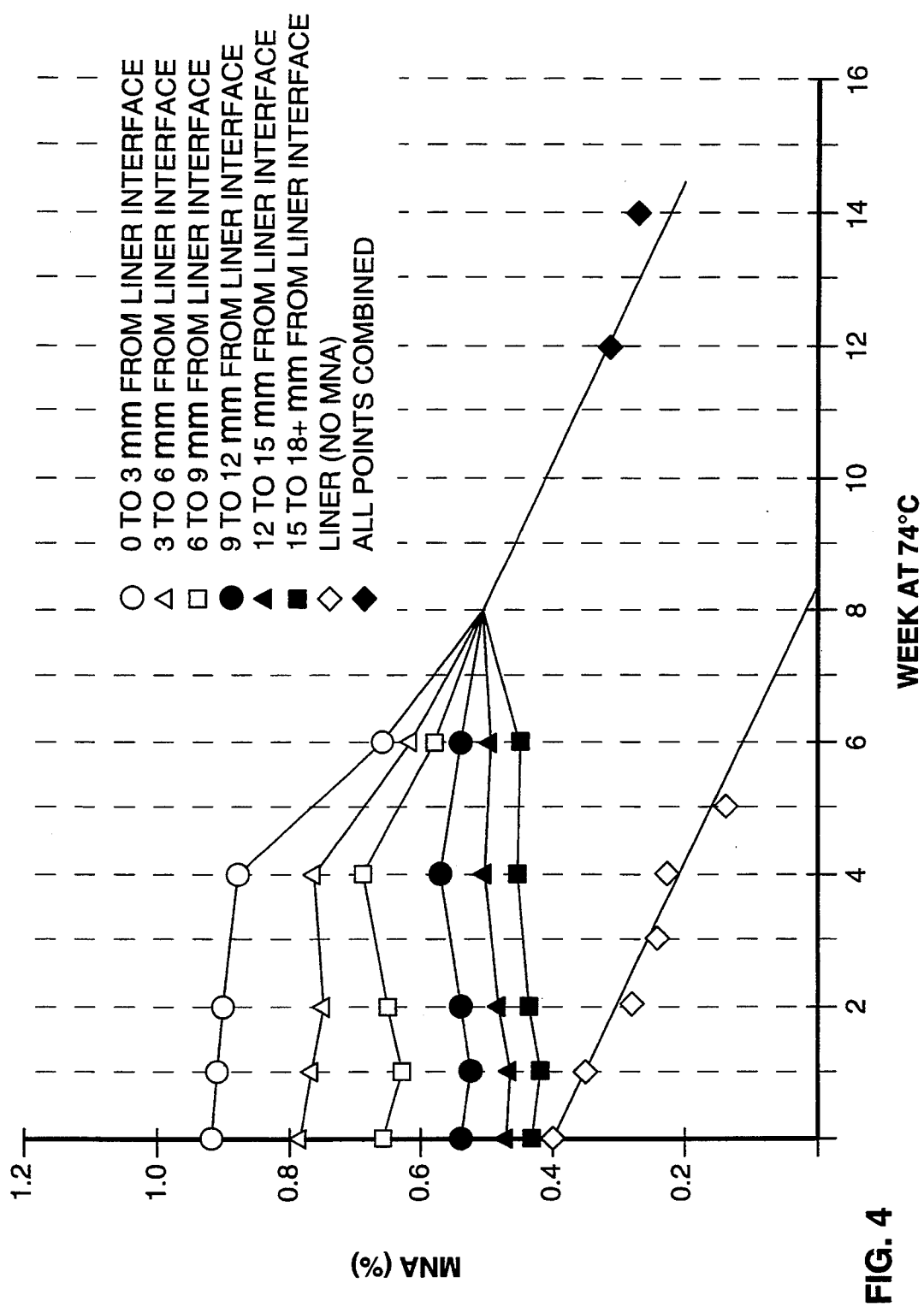
FIG. 4 is similar to FIG. 3, but shows MNA content at different distances from an insuliner/propellant interface.

Looking at FIG. 4, it is evident that MNA is effectively delivered to the propellant from the insulation and is equilibrated throughout the propellant. Comparing FIGS. 3 and 4, it is evident that MNA depletion proceeds more slowly when insulation is used as a source, probably because the insulation is thicker than the liner, and therefore contains a greater weight of MNA, even though the proportion of MNA in the insulation is lower than the proportion of MNA in the liner.

Figure 5:
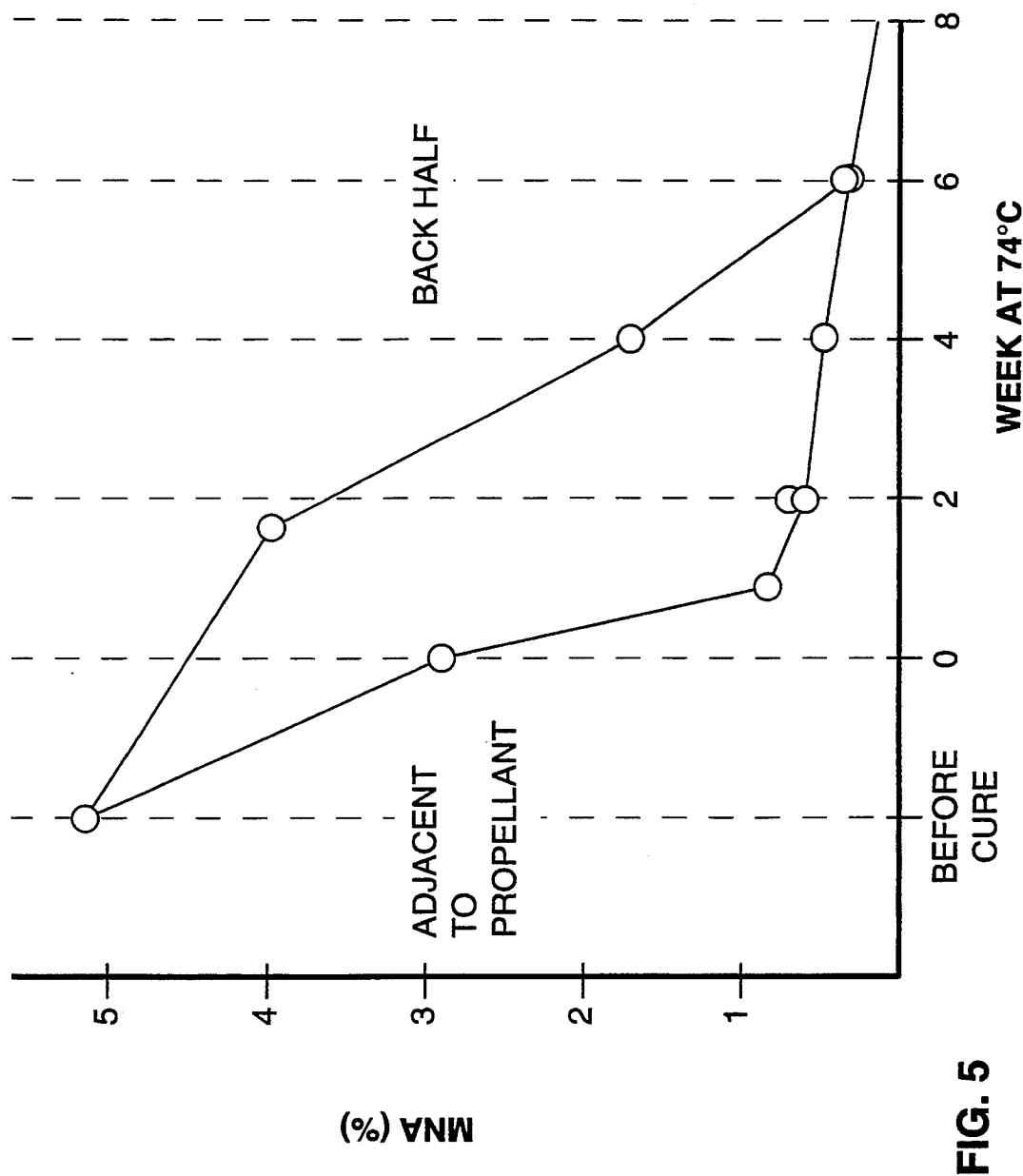
FIG. 5 is a plot of MNA content of insulation originally charged with MNA versus time. The two lines indicate two different sampling locations.

Samples of the HYPALON based insulation of Example 8 were taken from the "back half" (the portion nearest the shim) and from the portion adjacent to the propellant. Samples were taken before curing and at several other aging times, and analyzed for MNA content. The results of the analysis are in FIG. 5. Initially, the two samples had equivalent MNA content. Upon cure, the MNA content adjacent to the propellant dropped precipitously, confirming migration of MNA into the propellant. However, after six weeks of accelerated aging at 165° F. (74° C.), the proportions of MNA on the opposite sides of the insulation became identical, indicating that MNA content of the insulation equilibrated.

Examples 9 and 10, similar to Example 8, are run with comparable results. The polyisoprene insulation of Examples 11–13 is coated with Liner A before the propellant is cast in contact with the liner, providing a composite of a shim (representing the casing), insulation, a liner, and propellant as in Example 2. Then accelerated age testing, like in Example 2, is conducted with similar results. This illustrates that the choice of the liner composition is not critical, providing MNA can migrate through it, and that interposition of a liner between the insulation and the propellant does not substantially affect delivery of the nitrate ester stabilizer from the former to the latter.

We claim:

1. The combination of:
   A. A propellant grain comprising at least one nitrate ester and having a nonburning surface; and
   B. at least one stabilizing layer adjacent to said nonburning surface, comprising more than 10% by weight of a nitrate ester stabilizer;
   wherein said nitrate ester stabilizer is capable of migrating from said stabilizing layer into said propellant grain through said nonburning surface in a quantity sufficient to stabilize said nitrate ester in the portion of said grain adjacent to said nonburning surface.

2. The combination of claim 1, wherein said at least one stabilizing layer is bonded to said nonburning surface.

3. The combination of claim 1 wherein said at least one stabilizing layer is a liner.

4. A rocket motor liner composition, comprising more than 10% by weight of a mobile nitrate ester stabilizer incorporated therein.

5. The liner composition of claim 4, wherein said nitrate ester stabilizer is selected from the group consisting of:
   N-methyl-4-nitroaniline;
   2-nitrodiphenylamine;
   4-nitrodiphenylamine;
   sym-diethyldiphenylurea;
   diphenylamine; and
   mixtures thereof.

6. The liner composition of claim 4, wherein said nitrate ester stabilizer is N-methyl-4-nitroaniline.

7. The combination of claim 1, wherein said nitrate ester stabilizer is selected from the group consisting of:
   N-methyl-4-nitroaniline;
   2-nitrodiphenylamine;
   4-nitrodiphenylamine;
   sym-diethyldiphenylurea;
   diphenylamine;

and mixtures thereof.

8. The combination of claim 1, wherein said nitrate ester stabilizer is N-methyl-4-nitroaniline.

9. The liner composition of claim 4, substantially free of nitrate esters.

10. A method for increasing the storage life of a propellant grain having a nonburning surface and comprising a nitrate ester, comprising the step of placing at least one stabilizing layer adjacent to said non-burning surface, said at least one stabilizing layer comprising more than 10% by weight of a nitrate ester stabilizer to stabilize said nitrate ester in a region of said propellant adjacent to said nonburning surface.

11. The method of claim 10, comprising the subsequent step of storing said propellant grain.

12. The method of claim 10, wherein said stabilizing layer functions as a liner.

13. The combination of:
A. a propellant grain comprising at least one nitrate ester and less than 1% of a homogeneously incorporated nitrate ester stabilizer and having a nonburning surface; and
B. at least one stabilizing layer adjacent to said nonburning surface, comprising more than 10% by weight of a nitrate ester stabilizer;
C. wherein said nitrate ester stabilizer is capable of migrating from said stabilizing layer into said propellant grain through said nonburning surface in a quantity sufficient to stabilize said nitrate ester in said grain.

14. The combination of claim 13, wherein said nitrate ester stabilizer comprises about 0.5% of said grain.

* * * * *